United States Patent Office 3,592,892
Patented July 13, 1971

3,592,892
ANTIFUNGAL AND ANTIBACTERIAL NITRO-
ALKYL-N-PHENYLCARBAMATES
Heinz Gunter Nosler, Monheim, Rhineland, and Richard
Wessendorf, Hilden, Rhineland, Germany, assignors to
Henkel & Cie, GmbH, Dusseldorf-Holthausen, Germany
No Drawing. Filed July 25, 1968, Ser. No. 747,477
Claims priority, application Germany, Dec. 4, 1967,
H 64,654
Int. Cl. A01n 9/20
U.S. Cl. 424—300                                    18 Claims

ABSTRACT OF THE DISCLOSURE

Novel antimicrobic compositions having fast kill times comprised of nitroalkyl-N-phenylcarbamates and dimethyl sulfoxide and ethanol or propanol.

STATE OF THE ART

Many organic nitro compounds are known to possess anti-bacterial properties and examples of such compounds are aromatic nitro compounds, nitro-substituted pyridine derivatives, nitrofurfural derivatives, many aliphatic nitro, dinitro and polynitro compounds. Of particular interest as preservatives have been aliphatic nitro alcohols and brominated derivatives thereof due to their broad spectrum of activity. These compounds, however, have the disadvantage of showing signs of decomposition after storage under atmospheric conditions for a short time and they generally have only a low degree of activity which is disadvantageous for impregnating wood and textiles for instance.

Known fungicides include nitro alcohols and esters of nitro alcohols with mono- and polybasic carboxylic acids but these products are only effective against fungi and not against bacteria. Therefore, their limited spectrum is too restricted for general use as antimicrobic agents. Up to now, there has been no reliable known connection between chemical structure and antimicrobic activity. For example, Urbanski in "Nitro Compounds," Warsaw, 1964, page 449 et seq., discloses that ethyl 4-chloro-4,4-dinitro butyrate and 2-bromo-2-nitro-propanediol-1,(1,3) have a high activity against microorganisms while ethyl 4-bromo-4,4-dinitro butyrate and 2-chloro-2-nitro-propanediol-(1,3) are substantially devoid of any such activity.

In co-pending, commonly assigned U.S. patent application Ser. No. 747,453, filed on even date herewith and entitled "Novel Antimicrobic Compositions," there are described novel antimicrobic compositions having as the active ingredient a nitroalkyl-N-phenylcarbamate of the formula

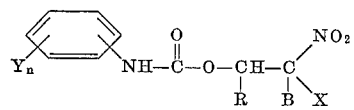

wherein Y is selected from the group consisting of chlorine and nitro, $n$ is a whole number from 0 to 2, R is selected from the group consisting of hydrogen and methyl, X is selected from the group consisting of hydrogen and bromine and B is selected from the group consisting of hydrogen, methyl, ethyl and a phenylcarbamic acid group of the formula

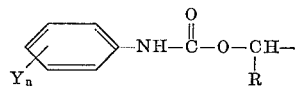

wherein Y, $n$ and R have the above definitions. These compositions are effective against gram positive and gram negative bacteria as well as against fungi at low concentrations. However, even though these compositions have a sufficient kill at low concentrations, they do not have a fast enough kill for some applications.

OBJECTS OF THE INVENTION

It is an object of the invention to provide novel antimicrobic compositions having a high degree of activity and a short kill time.

It is another object of the invention to provide synergistic antimicrobic compositions having a short kill time.

It is an additional object of the invention to provide novel methods of killing bacteria and fungi.

These and other objects and advantages of the invention will become obvious from the following detailed description.

THE INVENTION

The antimicrobic compositions of the invention are comprised of 0.05 to 5.0% by weight of a nitroalkyl-N-phenylcarbamate of Formula I, 5 to 30% by weight of an alcohol selected from the group consisting of ethanol and isopropanol and 10 to 50% of dimethyl sulfoxide. Preferably, the compositions contain 0.1 to 1.0% by weight of the carbamate, 10 to 20% by weight of the alcohol and 20 to 40% by weight of dimethylsulfoxide.

All the nitroalkyl-N-phenylcarbamates of Formula I possess bactericidal and fungicidal activity and are useful in antimicrobic compositions. Particularly preferred are the compounds of Formula I wherein X is bromine as they have a particularly high degree of activity and are effective microbicides at low concentrations. The compounds of Formula I have the advantages of strong fungicidal activity, excellent activity against gram-positive and gram-negative bacteria, no tendency to decompose and high degree of activity for impregnation.

Examples of specific nitroalkyl-N-phenylcarbamates of Formula I are:

2-nitroethyl-N-phenylcarbamate
2-nitroethyl-N-(3-chlorophenyl)-carbamate
2-nitroethyl-N-(3,4-dichlorophenyl)-carbamate
2-nitroethyl-N-(4-nitrophenyl)-carbamate
1-methyl-2-nitroethyl-N-(3,4-dichlorophenyl)-carbamate
2-nitropropyl-N-phenylcarbamate
2-nitropropyl-N-(3-chlorophenyl)-carbamate
2-nitrobutyl-N-phenylcarbamate
1-methyl-2-nitropropyl-N-phenylcarbamate
1-methyl-2-nitrobutyl-N-(4-nitrophenyl)-carbamate
2-bromo-2-nitroethyl-N1-(3-chlorophenyl)-carbamate
1-methyl-2-bromo-2-nitroethyl-N-phenylcarbamate
2-bromo-2-nitropropyl-N-(3-chlorophenyl)-carbamate
2-bromo-2-nitrobutyl-N-phenylcarbamate
2-bromo-2-nitrobutyl-N-(3,4-dichlorophenyl)-carbamate
1-methyl-2-bromo-2-nitropropyl-N-(4-nitrophenyl)-carbamate 1-methyl-2-bromo-2-nitrobutyl-N-phenylcarbamate
2-nitropropanediol-1,3)-bis-N-phenylcarbamate
2-nitropropanediol-(1,3-bis-N-(3,4-dichlorophenyl)-carbamate
1-methyl-2-nitropropanediol-(1,3)-bis-N-(3-chlorophenyl)-carbamate
1,3-dimethyl-2-nitropropanediol-(1,3)-bis-N-(4-nitrophenyl)-carbamate
2-bromo-2-nitropropanediol-(1,3)-bis-N-phenylcarbamate
2-bromo-2-nitropropanediol-(1,3)-bis-N-(3-chlorophenyl)-carbamate
2-bromo-2-nitropropanediol-(1,3)-bis-N-(3,4-dichlorophenyl)-carbamate
2-bromo-2-nitropropanediol-(1,3)-bis-N-(4-nitrophenyl)-carbamate
1-methyl-2-bromo-nitropropanediol-(1,3-)-bis-N-(3-chlorophenyl)-carbamate
1,3-dimethyl-2-bromo-nitropropanediol-(1,3)-bis-N-(3,4-dichlorophenyl)-carbamate.

The antimicrobic compositions of the invention may be in the form of liquid, pasty or solid preparations such as aqueous suspensions, emulsions, solutions in organic solvents, oils, ointments, creams, pencils, powders, soaps, toothpastes and mouthwashes which may be used as cleansing agents, general and special skin-treatment agents and other cosmetic preparations.

In a modification of the antimicrobic compositions of the invention, synergistic compositions are comprised of an effective amount of a complexing agent having a calcium carbonate binding capacity greater than 230 mg. per gm. of complexing agent in the Hampshire test and at least one nitroalkyl - N - phenylcarbamate of Formula I in a weight ratio of carbamate to complexing agent of 1:1000 to 50:1, depending upon the specific components, in addition to the dimethylsulfoxide and alcohol.

The complexing agent in the compositions of the invention having a calcium carbonate binding capacity of more than 230 mg. in the Hampshire test may belong to varied classes of compounds such as polycarboxylic acids, hydroxy carboxylic acids, aminocarboxylic acids, phosphonic acids and polyphosphonic acids and their alkali metal salts. The Hampshire method for determining calcium carbonate binding capacity is described in the publication of the Hampshire Chemical Corporation of June 1960, "Hampshire NTA Technical Bulletin," Appendix, page A2. In the method, exactly 2 gm. of a powdery complexing agent are dissolved in 50 cc. of distilled water after which the solution is neutralized and admixed with 10 ml. of a 2% sodium carbonate solution. The pH is adjusted to 11–12 and the solution is diluted to 100 ml. Then the solution is titrated with a calcium acetate solution containing 44.1 gm. of calcium acetate monohydrate per liter until a distinct and lasting turbidity occurs. The calcium carbonate-binding capacity is determined according to the formula:

$$\frac{\text{cc. calcium acetate solution} \times 25}{\text{weight portion of complexing agent}} = \frac{\text{mg. calcium carbonate bound}}{\text{per gm. of complexing agent}}$$

The antimicrobic compositions of the invention are compositions having an extremely short kill time and surprisingly improved activity.

In the following examples are described several preferred embodiments to illustrate the invention. However, it should be understood that the invention is not intended to be limited to the specific embodiment.

EXAMPLE I 0.1 mole of 2-nitroethanol was admixed with 0.12 mole of phenylisocyanate in anhydrous benzene and the mixture was heated at reflux for 4 to 5 hours. After distilling off the majority of the benzene, the residue was recrystallized from a 1:1 mixture of petroleum ether and benzene to obtain 2-nitroethyl-N-phenylcarbamate (agent A) having a melting point of 103° C.

Using the same procedure, the compounds of Table A were prepared from the appropriate alcohol and phenylisocyanate.

TABLE A

| Agent | Compound | Melting point, ° C |
|---|---|---|
| B | 2 nitropropyl-N-phenylcarbamate | 102 |
| C | 1-methyl-2-nitropropyl-N-phenylcarbamate | 93 |
| D | 2-nitropropyl-N-(3-chlorophenyl)-carbamate | 88 |
| E | 2-nitrobutyl-N-phenylcarbamate | 72 |
| F | 2-bromo-2-nitroethyl-N-(3-chlorophenyl)-carbamate | 105 |
| G | 2-bromo-2-nitropropyl-N-(4-nitrophenyl)-carbamate | |
| H | 2-bromo-2-nitrobutyl-N-phenylcarbamate | 87 |
| I | 2-bromo-2-nitrobutyl-N-(3,4-dichlorophenyl)-carbamate | 79 |
| K | 1-methyl-2-bromo-2-nitropropyl-N-(3-chlorophenyl)-carbamate | 94-95 |
| L | 2-nitropropanediol-(1,3)-bis-N-phenyl-carbamate | 115 |
| M | 2-bromo-2-nitropropanediol-(1,3)-bis-N-phenyl-carbamate | 126 |
| N | 2-bromo-2-nitropropanediol-(1,3)-bis-N-(3-chlorophenyl)-carbamate | 123 |
| O | 2-bromo-2-nitropropanediol-(1,3)-bis-N-(3,4-dichlorophenyl)-carbamate | 124 |
| P | 2-bromo-2-nitropropanediol-(1,3)-bis-N-(4-nitrophenyl)-carbamate | |

EXAMPLE

The threshold concentrations of 5 carbamates of Table A were determined by the so-called plate test. This variation of the dilution test for chemical disinfectants set up by Deutsche Gesellschaft für Hygene und Mikrobiologie has the advantage of using a solid culture media instead of a liquid culture media. Solid culture media have the advantage of being able to easily discern the effectiveness, particularly for fungicides.

The desired test concentrations were prepared by mixing specific amounts of the substance solutions of suitable concentrations with specific amounts of liquid bouillon or beerwort agars, in sterile petri-dishes. The amounts, measured with a pipette, of the substance solutions were a maximum of 0.1 cc to 1 ml. and the total volume in the petri-dishes after admixing with the culture media amount to 10 ml.

After solidification of the culture media, its surface was inoculated with the test germ suspension in bouillon or wort, which contained about $10^8$ germs per ml. The incubation took place at 37° C. or at 30° C. in the incubator, and lasted 8 days when bacterial Candida albicans was employed. When Epidermophyton Kaufmann-Wolf was used, it lasted 21 days. The duration of incubation of 21 days for Epidermophyton Kaufmann-Wolf was chosen to conform to the above standard test, because in the evaluation of disinfectants against fungi of the epithelium, a substance is considered as suitable when the growth of the fungi after predetermined duration of action is delayed by at least 21 days. Therefore, it was ascertained which of the substance concentrations worked into the culture media was just about capable to arrest the growth of the test germs completely. This value thus ascertained was indicated as threshold concentration. The tests were carried out in varying concentration intervals. If the tested carbamate composition did not contain alcohol, it was tested with a solution containing acetone. In the following tables, the concentrations and the destruction times for the compositions tested are reported.

TABLE I

| Ingredients in composition | Substance, percent | Active substance H ||||||| Active substance I |||||||
|---|---|---|---|---|---|---|---|---|---|---|---|---|---|---|---|
| | | Sta. aureus | E. coli | Pseudomonas | Candida | Epider. | Asperg. | Penic. | Sta. aureus | E. coli | Pseudomonas | Candida | Epider. | Asperg. | Penic. |
| Isopropanol | 10 | △ | △ | △ | △ | △ | △ | △ | △ | △ | △ | △ | △ | △ | △ |
| Dimethyl sulfoxide (DMSO) | 20 40 | △ | △ | △ | △ | △ | △ | △ | △ | △ | △ | △ | △ | △ | △ |
| Active substance | 0.1 0.5 | △ | △ | △ | △ | △ | △ | △ | △ | △ | △ | △ | △ | △ | △ |
| Isopropanol (DMSO) | 10 40 | | | | | | | | | | | | | | |
| | 20 40 | △ | △ | △ | △ | △ | △ | △ | △ | △ | △ | △ | △ | △ | △ |
| Do | 20 40 | △ | △ | △ | △ | △ | △ | △ | △ | △ | △ | △ | △ | △ | △ |
| Isopropanol agent | 10 0.1 | △ | △ | △ | △ | △ | △ | △ | △ | △ | △ | △ | △ | △ | △ |
| Do | 10 0.5 | △ | △ | △ | △ | △ | △ | △ | △ | △ | △ | △ | △ | △ | △ |
| Do | 20 0.1 | △ | △ | △ | 10 | △ | △ | △ | △ | △ | △ | △ | △ | △ | △ |
| Do | 20 0.5 | 10 | 10 | 5 | △ | 5 | △ | △ | 10 | 10 | 10 | △ | 3 | △ | △ |
| DMSO agent | 40 0.1 | △ | △ | △ | △ | △ | △ | △ | △ | △ | △ | △ | △ | △ | △ |
| Do | 40 0.5 | △ | △ | △ | △ | △ | △ | △ | △ | △ | △ | △ | 10 | △ | △ |
| Isopropanol DMSO agent | 10 40 0.1 | △ | △ | △ | △ | 0.5 | △ | △ | △ | △ | △ | △ | 0.5 | △ | △ |
| Do | 10 40 0.5 | 0.5 | 0.5 | 0.5 | 0.5 | 0.5 | 10 | 5 | 0.5 | 1 | 1 | 1 | 0.5 | 5 | 5 |
| Do | 20 40 0.1 | 1 | 0.5 | 0.5 | 3 | 0.5 | △ | △ | 1 | 0.5 | 0.5 | 1 | 0.5 | △ | 10 |
| Do | 20 40 0.5 | 0.5 | 0.5 | 0.5 | 0.5 | 0.5 | 0.5 | 0.5 | 0.5 | 0.5 | 0.5 | 0.5 | 0.5 | 1 | 0.5 |

NOTE.—Statement of killing time in minutes, △=no killing in 10 minutes. Test temperature: 20° C.

TABLE II

*Staphylococcus aureus* SG 511

| Ingredients in composition | Ingredient, percent | M | O | D |
|---|---|---|---|---|
| Isopropanol | 10 20 | △ | △ | △ |
| Dimethylsulfoxide (DMSO) | 40 | △ | △ | △ |
| Agent | 0.5 | △ | △ | △ |
| Isopropanol DMSO | 10 40 | | | |
| Isopropanol agent | 10 0.5 | △ | △ | △ |
| Do | 20 0.5 | 10 | 5 | △ |
| DMSO agent | 40 0.5 | △ | △ | △ |
| Isopropanol DMSO agent | 10 40 0.5 | 3 | 0.5 | 1 |
| Do | 20 40 0.5 | 0.5 | 0.5 | 0.5 |

NOTE.—Statement in killing time in minutes, △=no killing in 10 minutes. Test temperature: 20° C.

TABLE III

| Ingredients in composition | Ingredient, percent | H || I ||
|---|---|---|---|---|---|
| | | Sta. aureus | E. coli | Sta. aureus | E. coli |
| Isopropanol | 20 | △ | △ | △ | △ |
| Dimethylsulfoxide (DMSO) | 10 20 30 | △ △ △ | △ △ △ | △ △ △ | △ △ △ |
| Agent | 0.5 | △ | △ | △ | △ |
| Isopropanol DMSO | 20 10 | | | | |
| Do | 20 20 | △ | △ | △ | △ |
| Do | 20 30 | | | | |
| Isopropanol agent | 20 0.5 | 10 | 10 | 10 | 10 |
| DMSO agent | 10 0.5 | △ | △ | △ | △ |
| Do | 20 0.5 | △ | △ | △ | △ |
| Do | 30 0.5 | △ | △ | △ | △ |

TABLE III—Continued

| Ingredients in composition | Ingredient, percent | H || I ||
|---|---|---|---|---|---|
| | | Sta. aureus | E. coli | Sta. aureus | E. coli |
| Isopropanol DMSO agent | 20 10 0.5 | 5 | 5 | 5 | 3 |
| Do | 20 20 0.5 | 5 | 1 | 5 | 1 |
| Do | 20 30 0.5 | 1 | 0.5 | 1 | 0.5 |

NOTE.—Statement in killing time in minutes, △=no killing in 10 minutes. Test temperature: 20° C.

TABLE IV

| Ingredients in composition | Ingredient, percent | H | I |
|---|---|---|---|
| Ethanol | 10 20 | △ | △ |
| Dimethylsulfoxide (DMSO) | 40 | △ | △ |
| Agent | 0.5 | △ | △ |
| Ethanol DMSO | 10 40 | | |
| Do | 20 40 | △ | △ |
| Ethanol agent | 10 0.5 | △ | △ |
| Do | 20 0.5 | △ | 10 |
| DMSO agent | 40 0.5 | △ | |
| Ethanol DMSO agent | 10 40 0.5 | 3 | 3 |
| Do | 20 40 0.5 | 0.5 | 0.5 |

NOTE.—Statement of killing time in minutes, △=no killing within 10 minutes. Test germ: *Staphylococcus aureus* SG 511. Test temperature 20° C.

EXAMPLE III

Examples of complexing agents having a calcium carbonate binding capacity of more than 230 mg. per gm. of complexing agent are shown in Table V.

TABLE V

| Complexing agent | | Mg. of calcium carbonate bound by 1 gm. of agent |
|---|---|---|
| K-1 | 1-hydroxyhexane-1,1-diphosphonic acid | 280 |
| K-2 | α-Aminoethane-α,α-diphosphonic acid | 930 |
| | α-Aminobenzyl-α,α-diphosphonic acid | 1,460 |
| | Aminotrimethylenephosphonic acid (Dequest 2000) | 820 |
| | Ethylenediamine tetramethylene-phosphonic acid | 860 |
| | Aminodimethylenephosphonic acid N-acetic acid | 850 |
| | Iminodiacetic acid-N-methylene-phosphonic acid | 540 |
| K-3 | Hydroxyethanediphosphonic acid | 810 |
| | Phosphonic acetic acid | 270 |
| | Citric acid | 328 |
| K-4 | Diethylenetriaminopenta acetic acid (DTPA) | 275 |
| K-5 | 1,2-cyclohexanediamine-tetra acetic acid (CDTA) | 285 |
| K-6 | Ethylenediamino-tetra acetic acid (EDTA) | 402 |
| K-7 | Nitrilotriacetic acid (NTA) | 578 |
| K-8 | 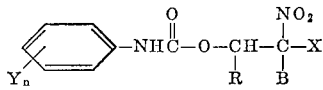 Chel DP(R) | 250 |

The complexing agents listed in Table VI have a calcium carbonate binding capacity below 230 mg. per gm. in the Hampshire test and when used in combination with the nitro alcohols in the test there was no increase in antimicrobic activity.

TABLE VI

| Complexing agent | Mg. of calcium carbonate per gm. of complexing agent |
|---|---|
| Hydroxymethylphosphonic acid | 1 |
| Mexoxalic acid monohydrate | 6 |
| 1-cysteinhydrochloride monohyrate | 14 |
| Glycolic acid | 45 |
| Tetra sodium pyrophosphate | 125 |
| n-Hexylaminodimethylenephosphonic acid | 160 |
| Sodium tripolyphosphate | 214 |
| Hexamethylenediamino-tetramethylene phosphonic acid | 220 |

As can be seen from Tables I to IV, the compositions of the invention kill the test germs within a very short period of time which cannot be obtained by any individual component or any combination of two components. It is only by the use of all 3 components that the kill time is so drastically reduced which is surprising.

PHARMACOLOGICAL EXAMPLES

Antimicrobial solution:                    Parts by weight
  2-bromo-2-nitrobutyl-N-phenylcarbamate ____ 0.5
  Isopropanol _____ 20.0
  Dimethylsulfoxide _____ 30.0
  Water _____ 50.0

Hand disinfectant:                          Parts by weight
  2 - bromo - 2 - nitrobutyl - N - (3,4-dichlorophenyl)-carbamate _____ 0.5
  Ethanol _____ 20.0
  Dimethylsulfoxide _____ 30.0
  Sodium lauryl sulfate _____ 7.5
  Coconut fatty acid monoethanolamide _____ .05
  Nitrilotriacetic acid _____ 2.0
  Water _____ 40.0

Disinfectant for instruments:               Parts by weight
  2 - bromo - 2 - nitropropanediol-(1,3)-bis-N-(3,4-dichlorophenyl)-carbamate _____ 0.5
  Isopropanol _____ 20.0
  Dimethylsulfoxide _____ 30.0
  α-Aminoethane-α,α-diphosphonic acid _____ 10.0
  Water _____ 40.0

(Especially effective against bacterially superimposed mycosis)

Antimicrobial tincture:                     Parts by weight
  2-bromo-2-nitrobutyl-N-phenylcarbamate ____ 0.5
  Ethanol _____ 20.0
  Dimethylsulfoxide _____ 40.0
  Hydrocortisone _____ 0.5
  Water _____ 40.0

Antimicrobial spray:                        Parts by weight
  2-bromo - 2 - nitrobutyl-(3,4-dichlorophenyl)-carbamate _____ 0.5
  Isopropanol _____ 25.0
  Dimethylsulfoxide _____ 20.0
  Water _____ 55.0
  Propellent gas _____ 100.0

Various modifications of the compositions and method of the invention may be made without departing from the spirit or scope thereof and it is to be understood that the invention is to be limited only as defined in the appended claims.

We claim:
1. An antifungal and antibacterial composition comprising water, 0.05 to 5.0% by weight of a nitroalkyl-N-phenylcarbamate of the formula

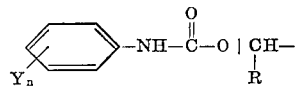

wherein Y is selected from the group consisting of chlorine and nitro, $n$ is a whole number from 0 to 2, R is selected from the group consisting of hydrogen and methyl, X is selected from the group consisting of hydrogen and bromine and B is selected from the group consisting of hydrogen, methyl, ethyl and a phenylcarbamic acid group of the formula $$\text{\textless phenyl\textgreater}_{Y_n}-NH-\overset{O}{\underset{\|}{C}}-O \mid \underset{R}{CH-}$$

wherein Y, $n$ and R have the above definitions, 10 to 50% by weight of dimethylsulfoxide and 5 to 30% by weight of an alcohol selected from the group consisting of ethanol and isopropanol.

2. The composition of claim 1 where X is bromine.
3. The composition of claim 1 wherein the amount of dimethylsulfoxide is 20 to 40% by weight.
4. The composition of claim 1 wherein the amount of phenylcarbamate is 0.1 to 1.0% by weight.

5. The composition of claim 5 wherein the amount of alcohol is 10 to 20% by weight.

6. The composition of claim 1 wherein the carbamate is 2-bromo-2-nitroethyl-N-(3-chlorophenyl)-carbamate.

7. The composition of claim 1 wherein the carbamate is 2-bromo-2-nitropropyl-N-(4-nitrophenyl)-carbamate.

8. The composition of claim 1 wherein the carbamate is 2-bromo-2-nitrobutyl-N-phenyl-carbamate.

9. The composition of claim 1 wherein the carbamate is 2-bromo-2-nitrobutyl-N-(3,4-dichlorophenyl)-carbamate.

10. The composition of claim 1 wherein the carbamate is 1-methyl-2-bromo-2-nitropropyl-N-(3-chlorophenyl)-carbamate.

11. The composition of claim 1 wherein the carbamate is 2-bromo-2-nitropropanediol-(1,3)-bis-N-phenyl-carbamate.

12. The composition of claim 1 wherein the carbamate is 2-bromo-2-nitropropanediol-(1,3)-bis-N-(3-chlorophenyl)-carbamate.

13. The composition of claim 1 wherein the carbamate is 2-bromo-2-nitro-propanediol-(1,3)-bis-N-(3,4-dichlorophenyl)-carbamate.

14. The composition of claim 1 wherein the carbamate is 2-bromo-2-nitropropanediol-(1,3)-bis-N-(4-nitrophenyl)-carbamate.

15. The composition of claim 1 wherein the alcohol is ethanol.

16. The composition of claim 1 wherein the alcohol is isopropanol.

17. The composition of claim 1 wherein there is also present a complex former having a calcium carbonate binding capacity greater than 230 mg. per gm. of complex former in a weight ratio of carbamate to complex former of 1:1000 to 50:1, said binding capacity being calculated as 25 times the number of cc. of solution of 44.1 gm. of calcium acetate monohydrate per liter to titrate to turbidity a solution of 2 gm. of complex former and 10 cc. of a 2% sodium carbonate solution diluted to 100 cc. divided by the weight portion of complex former.

18. The composition of claim 17 wherein the complex former is selected from the group consisting of polycarboxylic acids, hydrocarboxylic acids, aminocarboxylic acids, phosphonic acids and polyphosphonic acids.

References Cited

UNITED STATES PATENTS

| | | | |
|---|---|---|---|
| 2,951,786 | 9/1960 | Pullen et al. | 424—300 |
| 3,253,904 | 5/1966 | Harrison | 260—471C |

OTHER REFERENCES

Crown Zellerbach Product Information Bulletin, August 1961, pp. 1 and 5.

ALBERT T. MEYERS, Primary Examiner

V. D. TURNER, Assistant Examiner

U.S. Cl. X.R.

424—211, 223, 300

PO-1050
(5/69)

UNITED STATES PATENT OFFICE
CERTIFICATE OF CORRECTION

Patent No. 3,592,892      Dated July 13, 1971

Serial No. 747,477

Inventor(s) HEINZ GUNTER NOSLER and RICHARD WESSENDORF

Title: ANTIFUNGAL AND ANTIBACTERIAL NITRO-ALKYL-N-PHENYLCARBAMATES

It is certified that error appears in the above-identified patent and that said Letters Patent are hereby corrected as shown below:

Hon. Commissioner of Patents
Washington, D. C. 20231      Oct. 19, 1971

Sir:

Upon proofreading the above-identified patent, we have noted the following printer's errors:

| Patent | | Appln. | | |
|---|---|---|---|---|
| Col. | Line | Page | Line | |
| 2 | 59 | 4 | 13 | "..2-nitroethyl-N1-..", remove the "1" after the "N". |
| 3 | 2 | 4 | 20 | "2-nitropropanediol-1,3)..", add a "(" before the "1,3)". |
| 3 | 3 | 4 | 21 | "2-nitropropanediol-(1,3..", add a ")" after the "(1,3". |
| 7 | | 15 | 9 | In Table V, "K-3" refers to items beginning with "α-Aminobenzyl-α.." on line 9 to and including "Citric acid" on line 16, and bracket should extend to include all these items. |
| 7 | 40 | 16 | 13 | In Table VI, correct spelling of "monohydrate". |
| 7 | 66 | 17 | 7 | Under heading "Parts by weight" ".05" should be "0.5". |

UNITED STATES PATENT OFFICE
CERTIFICATE OF CORRECTION

Patent No. 3,592,892      Dated July 13, 1971

Serial No. 747,477

Inventor(s) HEINZ GUNTER NOSLER and RICHARD WESSENDORF

Title: ANTIFUNGAL AND ANTIBACTERIAL NITRO-ALKYL-N-PHENYLCARBAMATES

It is certified that error appears in the above-identified patent and that said Letters Patent are hereby corrected as shown below:

Page 2

Hon. Commissioner of Patents      Oct. 19, 1971

| Patent Col. | Line | Appln. Page | Line | |
|---|---|---|---|---|
| 8 | 65 | | | In Claim 1 the drawing between lines 8 and 9 in the Application "NH-C-O|CH-" should read "NH-C-O-CH". |
| 9 | 1 | | 2 | In Claim 5, "The composition of claim 5. should read "The composition of claim 1. |
| 10 | 13 | | 3 | In Claim 18, correct the spelling of "hydroxycarboxylic". |

Signed and sealed this 21st day of March 1972.

(SEAL)
Attest:

EDWARD M. FLETCHER, JR.
Attesting Officer

ROBERT GOTTSCHALK
Commissioner of Patents